US012110817B2

United States Patent
Nishimura et al.

(10) Patent No.: US 12,110,817 B2
(45) Date of Patent: Oct. 8, 2024

(54) THERMOSTAT DEVICE

(71) Applicant: NIPPON THERMOSTAT CO., LTD., Kiyose (JP)

(72) Inventors: Tetsuya Nishimura, Kiyose (JP); Masayuki Numata, Kiyose (JP)

(73) Assignee: NIPPON THERMOSTAT CO., LTD., Kiyose (JP)

(*) Notice: Subject to any disclaimer, the term of this patent is extended or adjusted under 35 U.S.C. 154(b) by 0 days.

(21) Appl. No.: 18/271,545

(22) PCT Filed: Nov. 11, 2021

(86) PCT No.: PCT/JP2021/041519
§ 371 (c)(1),
(2) Date: Jul. 10, 2023

(87) PCT Pub. No.: WO2022/163069
PCT Pub. Date: Aug. 4, 2022

(65) Prior Publication Data
US 2024/0133336 A1    Apr. 25, 2024
US 2024/0229704 A9    Jul. 11, 2024

(30) Foreign Application Priority Data

Jan. 28, 2021   (JP) .................................. 2021-012285

(51) Int. Cl.
*F01P 7/16*      (2006.01)
*F01P 7/14*      (2006.01)
*G05D 23/02*    (2006.01)

(52) U.S. Cl.
CPC ................ *F01P 7/16* (2013.01); *G05D 23/02* (2013.01); *F01P 2007/146* (2013.01)

(58) Field of Classification Search
CPC ........ F01P 7/16; F01P 2007/146; G05D 23/02
See application file for complete search history.

(56) References Cited

U.S. PATENT DOCUMENTS

2017/0074155 A1    3/2017   Shimomura

FOREIGN PATENT DOCUMENTS

| CN | 102884294 A   |   | 1/2013  |            |
|----|---------------|---|---------|------------|
| JP | 2005-155831 A |   | 6/2005  |            |
| JP | 2016008568 A  | * | 1/2016  | .............. F01P 11/18 |

OTHER PUBLICATIONS

Machine Translation of JP2016008568A PDF File Name: "JP2016008568A_Machine_Translation.pdf".*

(Continued)

*Primary Examiner* — Grant Moubry
*Assistant Examiner* — Ruben Picon-Feliciano
(74) *Attorney, Agent, or Firm* — HAUPTMAN HAM, LLP

(57) ABSTRACT

The thermostat device has a housing, a valve body provided around the periphery of a thermo-element inserted inside the housing, and a frame that supports one end of a coil spring that biases the valve body, wherein the housing has a hollow body having an opening at one end, a pair of legs rising from the opening edge of the body, and a hooking portion protruding inwardly at the tip of the legs; the hooking portion has an engaged portion located in the center of the width direction of the legs and an auxiliary portion connected to the engaged portion and located at both ends of the width direction of the legs, wherein an end face of the root side of the legs in the engaged portion is located farther from the tip of the legs than an end face of the leg-root side in the auxiliary portion.

12 Claims, 9 Drawing Sheets

(56) References Cited

OTHER PUBLICATIONS

PCT/ISA/210, "International Search Report for PCT International Application No. PCT/JP2021/041519," Feb. 1, 2022.

* cited by examiner

THERMOSTAT DEVICE

RELATED APPLICATIONS

The present application is National Phase of International Application No. PCT/JP2021/041519 filed Nov. 11, 2021, and claims priority from Japanese Application No. 2021-012285, filed Jan. 28, 2021, the disclosure of which is hereby incorporated by reference herein in its entirety.

TECHNICAL FIELD

The present invention relates to thermostat devices.

BACKGROUND FIELD

Among thermostat devices, as disclosed in Patent Document 1 (see FIG. 8), for example, there is a thermostat device that includes a hollow housing 60, a thermo-element 51 having one end inserted into the housing 60 and extending and contracting in response to temperature, a valve element 52 that opens or closes by expansion or contraction of the thermo-element 51, a coil spring 53 for biasing the valve body 52 in a closing direction, and a frame 65 for supporting one end of the coil spring 53, the frame 65 being hooked to the tips of the pair of legs 62, 62 of the housing 60.

CITATION LIST

PTL 1: JP-A-2005-155831

SUMMARY OF INVENTION

Technical Problem

In a conventional thermostat device, as shown in FIG. 9, the hooking portions 62a are formed by protruding the entire tip portion of the legs 62 inwardly, and the frames 65 working as a spring receiving portion are hooked on the hooking portions 62a. In such a case, when the housing is made of a metal material, such as aluminum, legs 62 will not deform, and the frame 65 will not fall off if a spring load of the coil spring 53 is applied at the hooking portions 62a.

However, for the purpose of cost reduction, weight reduction, etc., if the housing 60 including a pair of legs 62, 62 is changed as it is from metal to synthetic resin, the durability is reduced, and the spring load causes the tips of the pair of legs 62, 62 so as to move away from each other and deform to open the pair of legs 62, 62 and may cause the frame 65 to fall off.

It is an object of the present invention to provide a thermostat device capable of suppressing the opening of the legs of the housing and also preventing the frame from falling off, considering the problem above.

Solution to Problem

In order to solve the above-described problem, a thermostat device according to the present invention comprises
  a housing inside which a valve seat is formed,
  a thermo-element having one end disposed inside the housing and performing a telescopic operation in response to temperature,
  a valve body provided on an outer periphery of the thermo-element and being seated on and separated from the valve seat by the telescopic operation of the thermo-element,
  a biasing member biasing the valve toward the valve seat, and a frame supporting one end of the biasing member,
  wherein the housing includes a hollow body portion having an opening at one end and having the valve seat formed thereinside,
  a pair of legs, standing up from an opening edge of the body, hooked on the frame at the tip end; and
  hooking portions formed at the tip portion of the legs to protrude inward, on which the frame is hooked.

The hooking portion has an engaged portion located in the center of the width of the leg and an auxiliary portion, continuous with the engaged portion, located at both ends of the width of the leg. The end face of the root side of the legs in the engaged portion is located farther from the tip of the leg compared to the end face of the root side of the leg in the auxiliary portion, and the frame abuts the end face of the engaged portion.

According to the configuration above, the hooking portion of the tip end of the leg supporting the frame has the auxiliary portion extending in the width direction of the leg connected to the engaged portion in addition to the engaged portion with which the frame engages. Thus, when the spring load of the coil spring is applied to the engaged portion, the engaged portion would move against the auxiliary portion, but the deformation in the direction in which the tip ends of the pair of legs separate is suppressed by the reaction force against the spring load.

In the thermostat device, the boundary portion of the hooking portion and the leg may be R-chamfered, and the side surface of the engaged portion and the boundary portion between the engaged portion and the end faces of the auxiliary portion may be R-chamfered. This shape prevents stress concentration and improves the durability of the hooking portion.

In the thermostat device, both the side surfaces of the engaged portion may be separated toward the tip end of the leg. With this, the engaging portion of the frame is easily fitted to the engaged portion of the hooking portion at the assembly of the thermostat device, and assembly work becomes easy.

The thermostat device may be provided with ribs connecting the roots of the pair of legs. With this structure, the root of the leg can be reinforced with the ribs, and the separation of the legs of the housing can be further suppressed.

Advantageous Effects of Invention

According to the thermostat device of the present invention, the separation of legs can be inhibited, and falling off of the frame is prevented.

DESCRIPTION OF EMBODIMENTS

An embodiment of the thermostat according to the present invention will be described with reference to the drawings below. The thermostat device 10 according to the present invention shown in FIGS. 1 to 7 is installed in a coolant system of an engine, for example. Specifically, the thermostat device 10 is installed at the inlet-side or outlet-side of the engine of a cooling path connecting a radiator and the engine and controls the coolant temperature circulating through the engine by opening or closing the cooling path depending on the temperature of the coolant.

Figure 3:
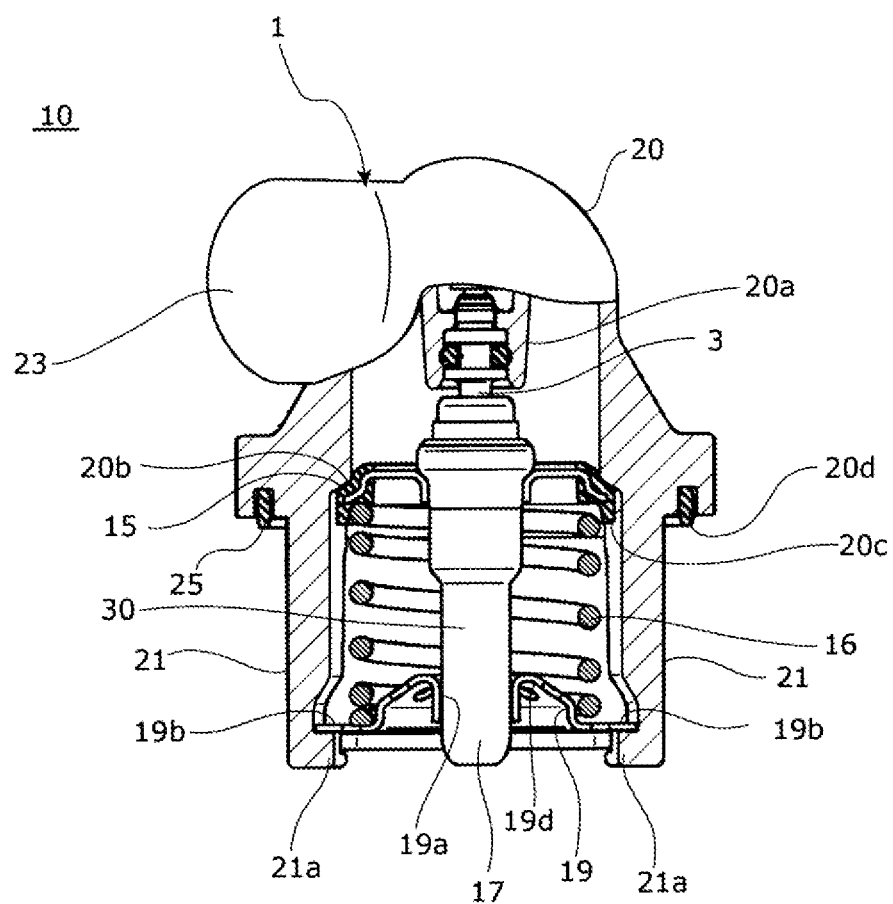
FIG. 3 is a partial cross-sectional view of an embodiment of the thermostat according to the present invention.

As shown in FIG. 3, the thermostat device 10 includes a hollow housing 1, a thermo-element 17 one end of which is inserted in the housing 1, a valve body 15 provided on the outer periphery of the thermo-element 17, which opens and closes the cooling path, a coil spring 16 as a biasing member which biases the valve body 15 in the closing direction, and a frame 19 which support one end of the coil spring 16. For the convenience of description, the upper and lower portions of the thermostat device 10 shown in FIG. 3 are simply referred to as "the upper" and "the lower."

In the present embodiment, the housing 1 is formed of synthetic resin. The housing 1 includes a body 20 having a capped nearly-cylinder shape formed with an opening 20c at the lower end, a pair of legs 21, 21 extending downward facing each other from the edge of the opening at the lower end of the body 20, a radiator-side connecting port 23 disposed at the top of the body 20, and a pair of flanges 2, 2 protruding outward from the lower end outer periphery of the body 20. The coolant passes through the connection port 23, the inside of the body 20, and the opening 20c, which compose a part of the cooling path.

The pair of flanges 2, 2 have a bolt hole 2a each. The bolt hole 2a has a metal sleeve press-inserted (not reference-signed), and through which a bolt is inserted (not shown) with which the thermostat device 10 is fixed to the counterpart member. When the thermostat device is disposed at the inlet side of the coolant path of the engine of an automobile, for example, the thermostat device is attached to the water pump. The counterpart member here is a member on the water pump side to which the thermostat device is attached.

Further, at the edge of the lower end opening of the body 20 located inside of the bolt holes 2a, an annular groove 20d surrounding the opening 20c, the gasket 25 is mounted in the groove 20d. The gasket 25 seals between the thermostat device 10 and the counterpart member, and prevents the coolant flowing the housing 1 from leaking outward in a state where the thermostat device is attached to the counterpart member. The inside of the housing 1 denotes the inner side (inner portion) of the gasket 25 in the body 20.

An annular-shape valve seat 20b is formed on the inner periphery just above the edge of the lower opening of the body 20 located inside the housing 1, and the coolant path is opened and closed when the valve body 15 unseats from or seats on the valve seat 20b.

A thermo-element 17 is inserted into the housing 1. The thermo-element 17 is disposed on the axial portion of the body 1 to align with the axial line. The thermo-element 17 includes an element case 30 in which a thermal expansion body such as wax is sealed, and a piston 3 is inserted in the element case 30 retractably.

When the temperature of the coolant around the element case 30 rises and the thermal expansion body inside expands, the piston 3 retracts from the element case 30, and thermo-element 17 elongates. In contrast, when the temperature of the coolant around the element case 30 lowers and the thermal expansion body inside contracts, the piston 3 enters the element case 30, and the thermo-element 17 contracts. Thus, the thermo-element 17 elongates and contracts, depending on the temperature.

The tip end of the piston 3 located at the top end of the thermo-element 17 fits a tubular boss 20a formed at the inner top portion of the body 20. This causes to prevent the movement upward of the piston 3 against the housing 1. The elongation and contraction of the thermo-element 17 cause the element case 30 to move downward or upward, without changing the position of the piston 3 against the housing 1.

The valve body 15 is fixed to the outer periphery of the element case 30. The valve body 15 moves upward or downward with the element case 30 along with the elongation and contraction of the thermo-element 17. When the valve body 15 moves downward due to the extension of the thermo-element 17, because the valve body 15 is unseated from the valve seat 20b to allow the coolant to pass therebetween, the communication of the coolant path is allowed. When the valve body 15 moves upward to seat in the valve seat 20b due to the contraction of the thermo-element 17, the communication of the coolant path is closed. Thus, the valve body 15 opens or closes the coolant path by seating on or unseating from the valve seat 20b.

The upper end of the coil spring 16 abuts the backside of the valve 15. The coil spring 16 is disposed so as to surround the periphery of the thermo-element 17. The lower end (one end) of the coil spring 16 is supported by the frame 19.

The frame 19 is hooked on the tip end of the pair of legs 21, 21 formed on the housing 1, and the movement downward against the housing 1 is blocked. Specifically, the frame 19 is provided with an annular spring seat 19d which a through hole 19a is formed at the center and engaging portions 19b, which protrude on both sides in the diameter direction from the outer periphery of the spring seat 19d and are caught on the tip portion of the legs 21, 21. The element case 30 is movably inserted through the through hole 19a upward and downward. This means that the element case 30 is movable upward and downward against the frame 19.

The coil spring 16 is a compression spring and is disposed between the valve body 15 and the frame 19 in a compressed state. The valve body 15 is biased upward (to the valve seat 20b side) by the coil spring 16. In this configuration, when the temperature of the coolant around the thermo-element 17 rises high and the thermo-element 17 extends, the valve body 15 moves downward against the biasing force of the coil spring 16 and is unseated from the valve seat 20b. Meanwhile, when the temperature of the coolant around the thermo-element 17 becomes low and the thermo-element 17 contracts, the valve body 15 moves upward by the biasing force of the coil spring 16 to approach the valve seat 20b.

Figure 1:
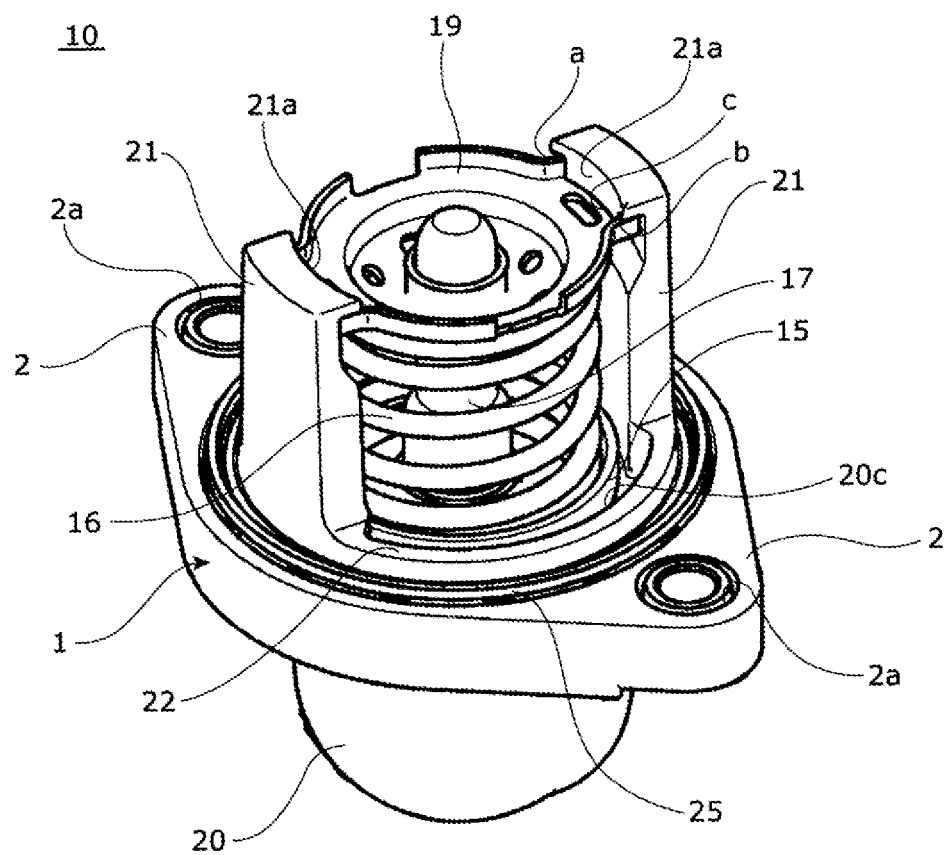
FIG. 1 is a perspective view of an embodiment of the thermostat according to the present invention viewed from the tip end side.
Figure 2:
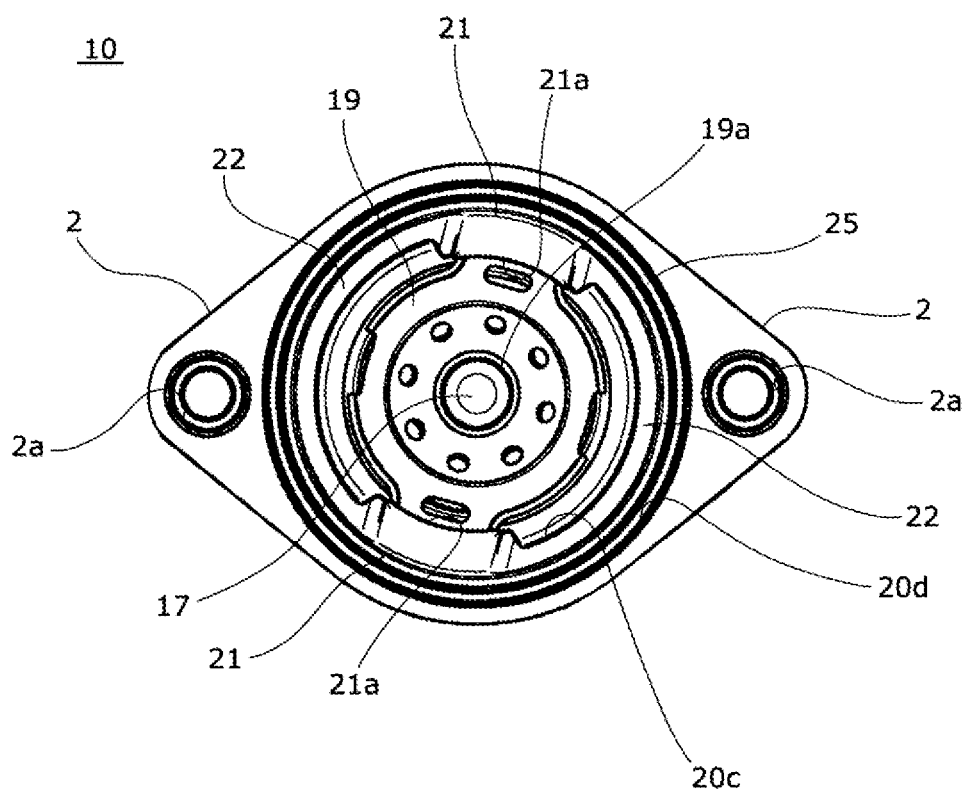
FIG. 2 is a bottom view of an embodiment of the thermostat according to the present invention.

As shown in FIG. 1, the housing 1 includes a pair of legs 21, 21, and hooking portions 21a formed at the tip of each leg 21, and an arc-shaped rib 22 standing up along the edge of the opening 20c and connecting the roots of the pair of legs 21, 21. The engaging portion 19b of the frame 19 engages with the hooking portion 21a.

Figure 4A:
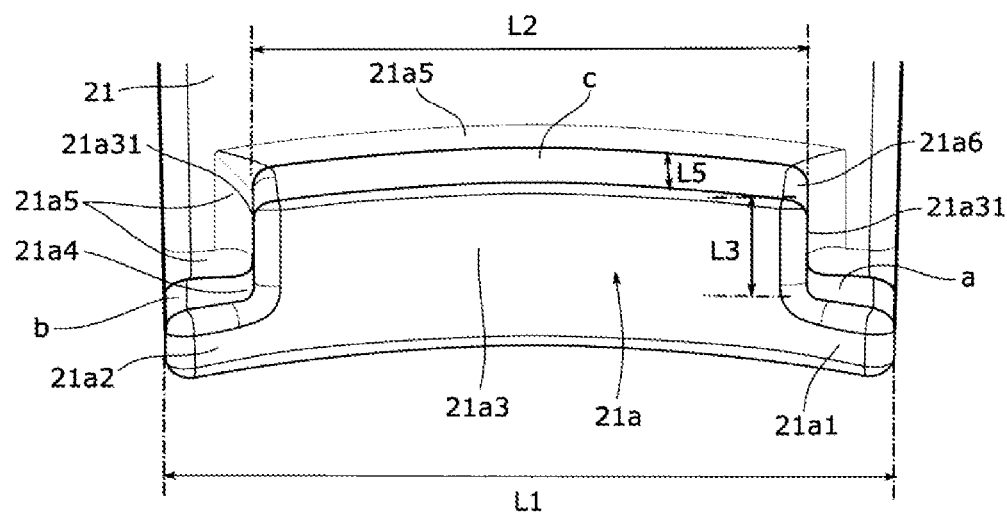
FIG. 4(a) is a partially enlarged view showing the enlarged tip end of the legs of the thermostat device according to an embodiment of the present invention, viewed from the inside of the pair of legs.
Figure 4B:
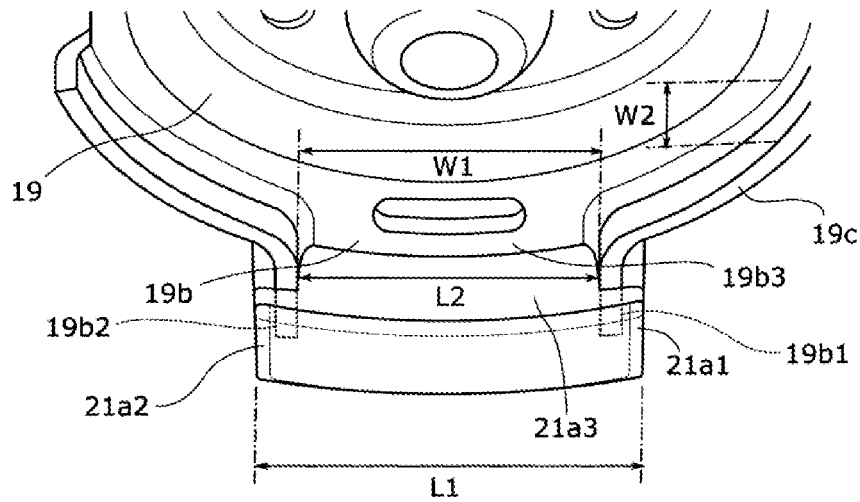
FIG. 4(b) is a partially enlarged perspective view illustrating the engagement relation between the tip end of the legs and the frame, shown in FIG. 4(a)

FIG. 4(a) shows an enlarged view of the hooking portion 21a formed at the tip end of the legs 21, viewed from the inside of the pair of legs 21, 21. FIG. 4(b) shows an enlarged perspective view showing the relation of engagement between the hooking portion 21a and the engaging portion 19b of the frame 19.

The hooking portion 21a protrudes from the tip end of the leg 21 inward (toward the facing legs 21). The hooking portion 21a is formed to have the vertical length in the width direction at the center of the leg 21 larger than that at both sides, forming an inverted T shape. In the hooking portion 21a, the portion having a longer vertical length at the center of the leg 21 in the width direction is an engaged portion 21a3, and the portions having a shorter vertical length on both sides in the width direction of the leg 21 are auxiliary portions 21a1 and 21a2. The upper (the root side of the leg 21) side end face c at the engaged portion 21a3 is located at a higher (farther from the tip end of the leg 21) position than the upper (the root side of the leg 21) end face a,b at the auxiliary portions 21a1, 21a2. Thus, the end face c of the engaged portion 21a3 and end faces a and b of the auxiliary portions 21a1 and 21a2 are formed in different levels, and the engaging portion 19b of the frame 19 is placed on the engaged portion 21a3.

As shown in FIG. 4(b), the engaging portion 19b of the frame 19 has a mounting plate 19b3 abutting the end face c of the engaged portion 21a3 and a pair of side plates 19b1 and 19b2 that stand up facing each other from both ends of the mounting plate 19b3 and sandwich the engaged portion 21a3 from both side in the width direction. The side plates 19b1 and 19b2 are continuous to the rib 19c standing up along the outer periphery of the spring seat 19d.

As shown in FIG. 4(a), the lateral width of the engaged portion 21a3 at the hooking portion 21a is formed to be wider than the sum of the lateral widths of auxiliary portions 21a1 and 21a2. A straight-line distance L2 from one end in the lateral width direction of the engaged portion 21a3 to the other is formed to be equal to or slightly shorter than the distance W1 between the pair of side plates 19b1 and 19b2 of the engaging portion 19b (L2≤W1), thereby the engaged portion 21a3 is fitted without rattling between the pair of side plates 19b1 and 19b2.

The height of the side plates 19b1 and 19b2 is equal to the height of the rib 19c and is made to be the length in a way where the side plates 19b1 and 19b2 do not interfere with the end faces a and b of the auxiliary portions 21a1 and 21a2 in a state where the mounting plate 19b3 abuts the end face c of the engaged portion 21a3. In other words, the distance W2 from the root of the side plates 19b1 and 19b2 to the tip is shorter than the difference in height direction L3 between the end face c of the engaged portion 21a3 and the end faces a and b of the auxiliary portions 21a1 and 21a2 (W2<L3). Thus, the side plates 19b1 and 19b2 do not interfere with the auxiliary portions 21a1 and 21a2, in a state where the engaging portion 19b of the frame 19 is engaged with the hooking portion 21a.

The inward protruding height L5 of the hooking portion 21a protruding inward from the tip end of the leg 21 is appropriately set considering the easiness of assembly and engagement with the frame 19.

Further, the boundary portion 21a5 between the hooking portion 21a and the leg 21, the boundary portion 21a6 between the side surface 21a31 of the engaged portion 21a3 and the end face c in the hooking portion 21a, and the boundary portions between the side surface 21a31 of the engaged portion 21a3 and end faces a and b of the auxiliary portions 21a2 are an R-chamfered surface, respectively.

As described above, the thermostat device 10 according to one embodiment of the present invention comprises
- a housing 1 inside which a valve seat 20b is formed,
- a thermo-element 17 having one end disposed inside the housing 1 and performing a telescopic operation in response to temperature,
- a valve body 15 provided on an outer periphery of the thermo-element 17 and being seated on and separated from the valve seat 20b by the telescopic operation of the thermo-element 17,
- a coil spring (a biasing member) 16 biasing the valve 15 toward the valve seat 20b, and a frame 19 supporting the lower end (one end) of the coil spring 16.

The housing 1 includes a hollow body 20 which has an opening 20c at the lower end (one end) and inside of which the valve seat 20b is formed,
- a pair of legs 21, 21, standing up from an opening edge of the body 20, a hooking portion 21a formed at the tip end of the leg 21 to protrude inward, on which the frame 19 is hooked. The hooking portion has an engaged portion 21a3 located in the center of the width of the leg 21 and auxiliary portions 21a1 and 21a2, continuous with the engaged portion 21a3, located at both ends of the lateral width of the leg 21. The end face c of the root side of the leg 21 in the engaged portion 21a3 is located farther from the tip of the leg 21 compared to the end faces a and b of the root side of the leg 21 in the auxiliary portions 21a1 and 21a2 and the frame 19 abuts the end face c of the engaged portion 21a3.

According to the present embodiment, the hooking portion 21a at the tip end of the leg 21 supporting the frame 19 has, in addition to the engaged portion 21a3 with which the frame 19 engages, the auxiliary portions 21a1 and 21a2 that are connected to the upper end of the engaged portion 21a3 and extend in the lateral direction of the leg 21. Thus, when the spring load of the coil spring 16 acts on the engaged portion 21a3 downwardly, the engaged portion 21a3 would move downward against the auxiliary portion 21a1 and 21a2, but the deformation in the direction in which the tip ends of the pair of legs 21, 21 separate is suppressed by the reaction force resisting the movement. That is, the above configuration inhibits the widening of the legs 21 of the housing 1 and prevents the frame 19 from falling off.

In the present embodiment, the boundary portion 21a5 between the hooking portion 21a and the leg 21, the boundary portion 21a6 between the side surface 21a31 of the engaged portion 21a3 and the end face c in the hooking portion 21a, and the boundary portions between the side surface 21a31 of the engaged portion 21a3 and end faces a and b of the auxiliary portions 21a2 are an R-chamfered surface, respectively. Since this structure prevents stress concentration, the durability of the hooking portion 21a can be improved. Part or all of the above boundary portions may be non-rounded edge shape, as far as the durability of the hooking portion 21a is secured.

Figure 5:
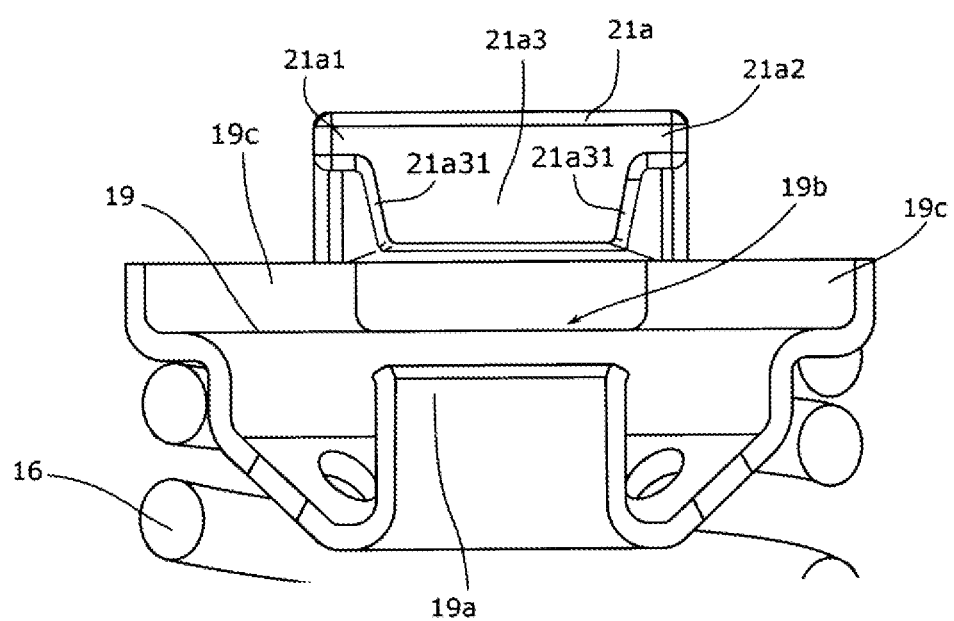
FIG. 5 is a partially enlarged perspective view of a thermostat device of the first modification example of an embodiment of the present invention illustrating the engagement relation between the tip end of the legs of the frame.

In the present embodiment, as shown in FIG. 4(a), both side surfaces 21a31 and 21a31 of the engaged portion 21a3 are parallel, but not should be. For example, as shown in FIG. 5, both side surfaces 21a31 and 21a31 of the engaged portion 21a3 may be separated as it goes toward the tip end of the leg 21. This structure causes to be easy to fit the engaging portion 19b of the frame 19 to the engaged portion 21a3 of the hooking portion 21a when assembling the thermostat device 10 and easy to assemble.

The thermostat device 10 of the present embodiment includes the rib 22 connecting the roots of the pair of the legs 21, 21. This configuration enables reinforcing the roots of the leg 21 with the rib 22; the separation of the leg 21 of the housing 1 can be further inhibited.

Figure 6:
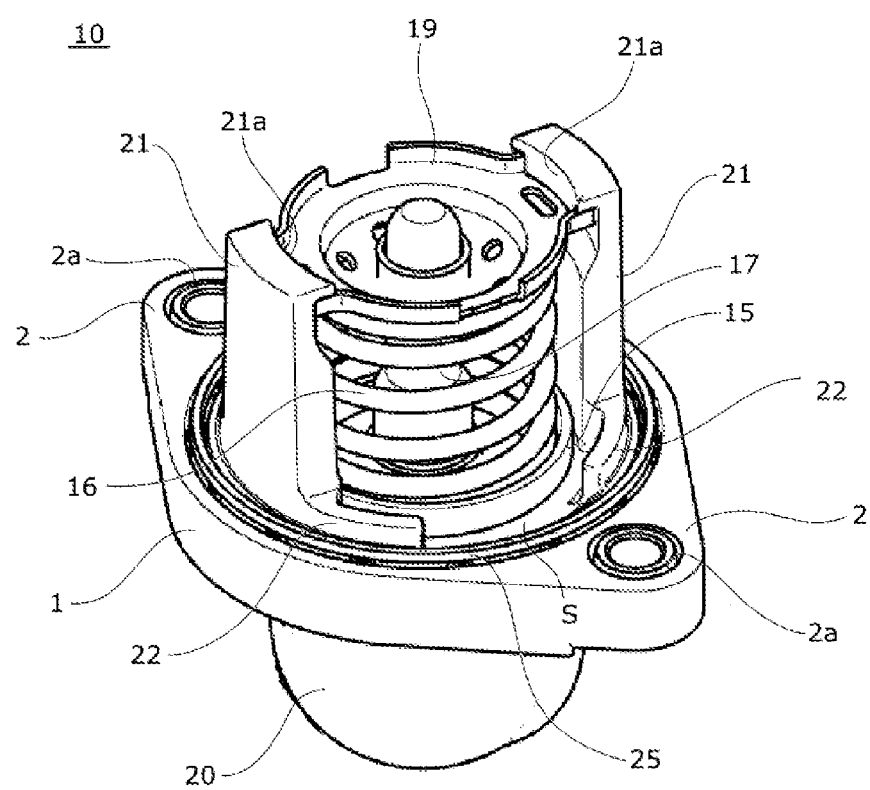
FIG. 6 is a perspective view of a thermostat device of the second modification example of an embodiment of the present invention viewed from the tip end side of the legs.
Figure 7:
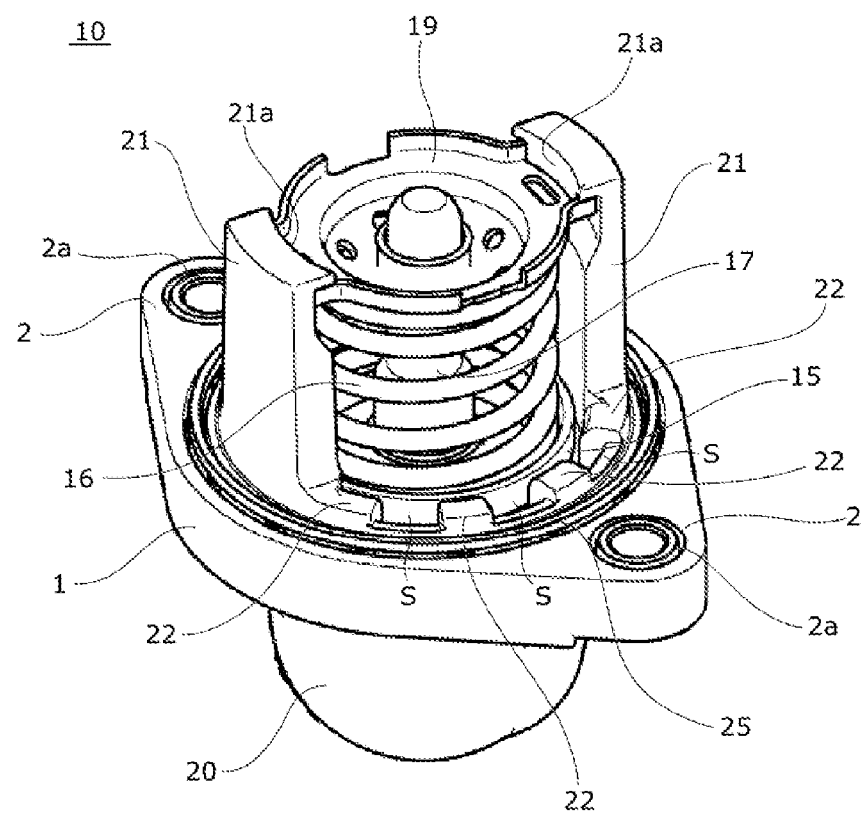
FIG. 7 is a perspective view of a thermostat device of the third modification example of an embodiment of the present invention viewed from the tip end side of the legs.
Figure 8:
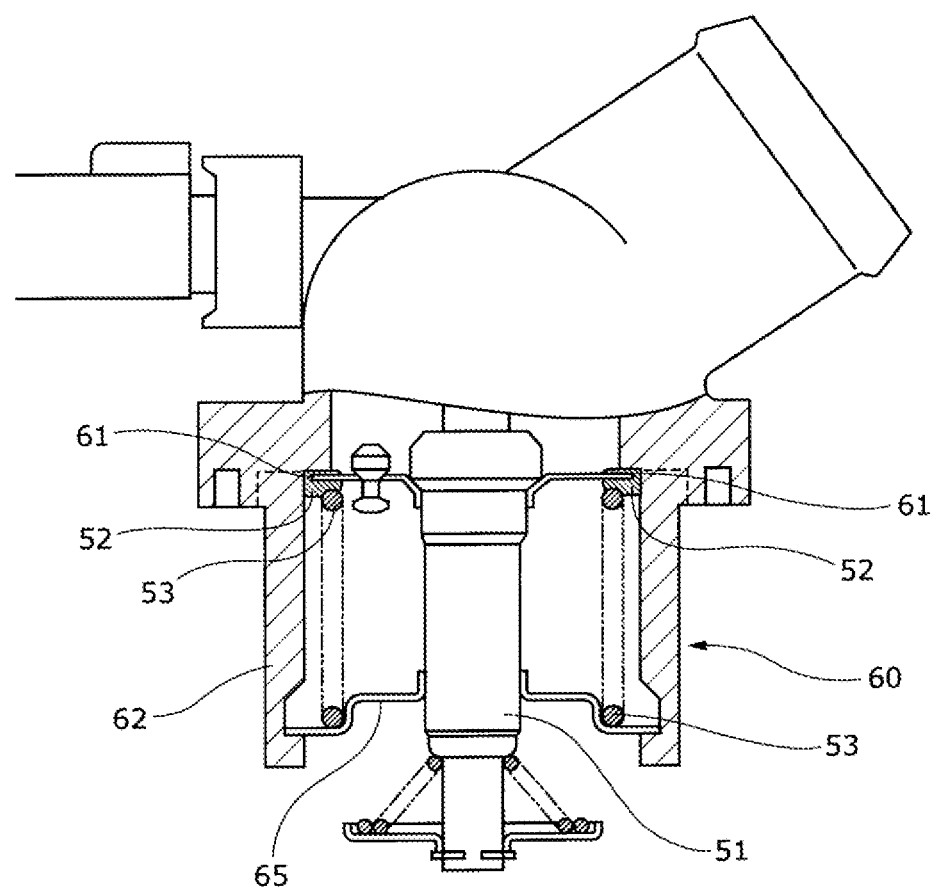
FIG. 8 is a partial cross-sectional view of a conventional thermostat device.
Figure 9:
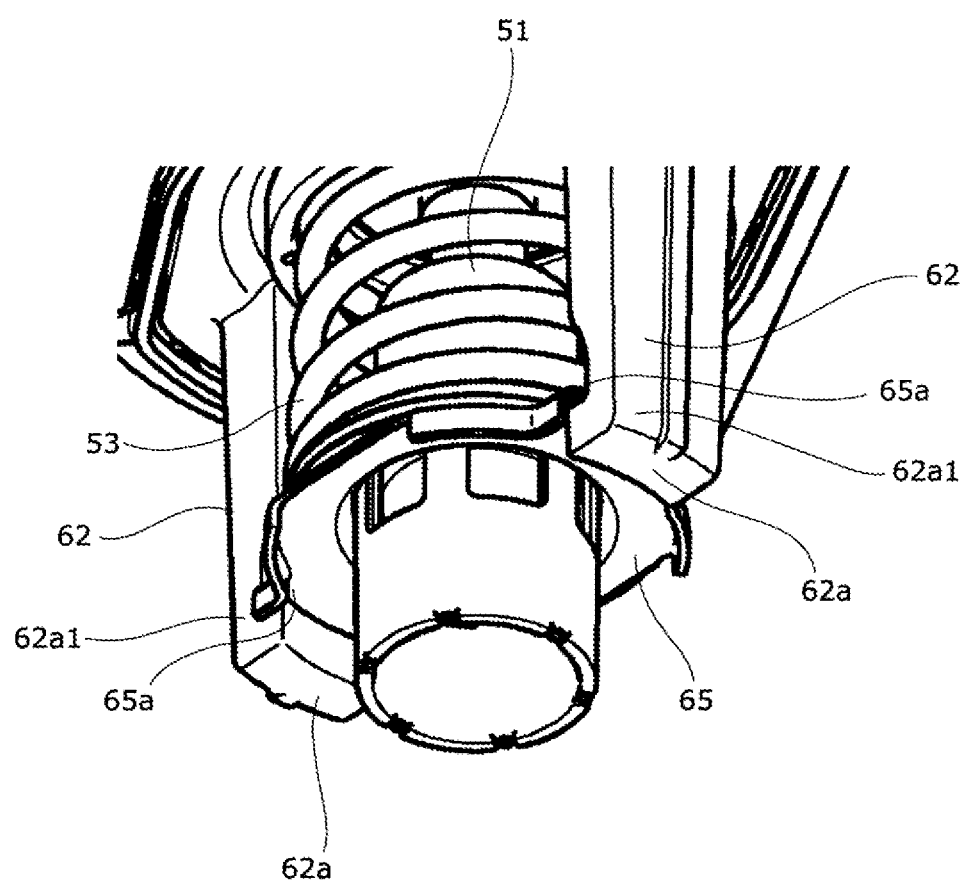
FIG. 9 is an enlarged perspective view of a part of the conventional thermostat device.

However, as shown in FIGS. 6 and 7, ribs are formed intermittently, and an opening portion S may be formed between adjacent ribs 22, 22. When the opening portion S is formed, the coolant actively passes through the opening portion S as the valve 15 is opened. That is, the flow of the coolant can be controlled by adjusting the position, the number, and the size of the opening portion S.

For example, when the thermostat device 10 is disposed on the inlet side of the engine, pressure loss is decreased by disposing the opening portion S of the thermostat device 10 unevenly to the engine outlet side. When the thermostat device 10 is disposed on the inlet side of the engine and a connecting port (not shown) as a delivery inlet port for high-temperature coolant which does not pass through the radiator, in addition to the connecting port 23 as a delivery inlet port for low-temperature coolant passing through the radiator, mixing of high- and low-temperature coolant is performed appropriately if the opening portion S is disposed unevenly opposite to the engine outlet side of the thermostat device 10. In that case, the ribs 22 may be omitted.

As described above, when the thermostat device 10 is disposed at the inlet side of the engine, and the low-temperature coolant passing through the radiator flows in through the connecting port 23, the spring constant of the coil spring 16 should be large so that the valve body 15 not be opened by the pressure of the coolant at the connecting port side, and resultantly the force acting on the legs 21 in the direction of separation becomes larger. Thus, the application of the present invention is particularly effective for the thermostat device 10 which is disposed at the inlet side of the engine. The present invention, however, may be applied to the thermostat device disposed at the outlet side of the engine.

As in the present embodiment, when the housing 1 of the thermostat device 10 is made of synthetic resin, the problem of falling off of the frame 19 is apt to occur compared to the case of metal-made housing. Thus, the application of the present invention is particularly effective for the thermostat device whose housing is made of synthetic resin. The present invention, however, may be applied to the thermostat device whose housing is made of metal.

The preferable embodiment of the present invention is described in detail; modifications, transformations, and alterations are possible as far as departing from the scope of the claims.

REFERENCE SIGNS LIST 1 housing
2 flange
2a bolt hole
3 piston
10 thermostat device
15 valve body
16 coil spring (biasing member)
17 thermo-element
19 frame
19b engaging portion
20 body
20a boss
20b valve seat
20c opening
21 leg
21a hooking portion
21a1 auxiliary portion
21a2 auxiliary portion
21a3 engaged portion
21a4 boundary portion between the engaged portion and the end faces of the auxiliary portion
21a5 boundary portion between the hooking portion and the leg
21a6 boundary portion between the side surface and the edge portion and the end face of the engaged portion
22 rib
a, b end faces of the root side of the leg in the auxiliary portions
c end faces of the root side of the leg in the engaged portions

The invention claimed is:

1. A thermostat device, comprising,
a housing inside which a valve seat is formed;
a thermo-element having one end disposed inside the housing and performing an expanding/contracting operation in response to a temperature;
a valve body provided on an outer periphery of the thermo-element and being seated on and separated from the valve seat by the expanding/contracting operation of the thermo-element;
a biasing member biasing the valve body toward the valve seat; and
a frame supporting one end of the biasing member,
wherein the housing comprises a hollow body having an opening at one end and having the valve seat formed therein, a pair of legs standing up from an opening edge of the hollow body, and a hooking portion hooking on the frame is formed to protrude inward at the tip end of the leg,
wherein the hooking portion includes an engaged portion located at a center of a lateral width direction of the leg and auxiliary portions located on both ends of the lateral width direction of the leg, continuous with the engaged portion; an end face of a root side of the leg at the engaged portion is located at a distal position from the tip end of the leg compared to an end face of the root side of the leg at the auxiliary portion; and the frame is in contact with the end face of the engaged portion, and
wherein the frame is provided with a mounting board in contact with the end face of the engaged portion and a pair of side plates standing opposite to each other from both ends in a width direction of the mounting board, and of the engaged portion and the auxiliary portion which are constituting the hooking portion, the engaged portion is fitted between the pair of side plates.

2. The thermostat device of claim 1, wherein a boundary portion between the hooking portion and the leg has an R-chamfered shape.

3. The thermostat device recited in claim 2, wherein two sides of the engaged portion are separated as they move toward the tip of the leg.

4. The thermostat device recited in claim 3, wherein a rib connecting the roots of the pair of legs is included.

5. The thermostat device recited in claim 2, wherein a rib connecting the roots of the pair of legs is included.

6. The thermostat device of claim 1, wherein a side surface of the engaged portion and a boundary portion between the engaged portion and the end face of the auxiliary portion is R-chamfered, respectively.

7. The thermostat device recited in claim 6, wherein two sides of the engaged portion are separated as they move toward the tip of the leg.

8. The thermostat device recited in claim 7, wherein a rib connecting the roots of the pair of legs is included.

9. The thermostat device recited in claim 6, wherein a rib connecting the roots of the pair of legs is included.

10. The thermostat device recited in claim 1, wherein two sides of the engaged portion are separated as they move toward the tip of the leg.

11. The thermostat device recited in claim 10, wherein a rib connecting the roots of the pair of legs is included.

12. The thermostat device recited in claim 1, wherein a rib connecting the roots of the pair of legs is included.

\* \* \* \* \*